United States Patent

[11] 3,558,011

| [72] | Inventor | James A. Tracy |
| | | 1602 Gracewood Drive, Greensboro, N.C. 27408 |
| [21] | Appl. No. | 754,203 |
| [22] | Filed | Aug. 21, 1968 |
| [45] | Patented | Jan. 26, 1971 |

[54] FLOW CONTROL DEVICE WITH RESTRICTED TERMINAL DELIVERY
8 Claims, 2 Drawing Figs.

[52] U.S. Cl. .................................................. 222/20,
141/128
[51] Int. Cl. ...................................................... B65d 5/38
[50] Field of Search .......................................... 177/122,
123; 141/128; 222/14, 20, 76, 52; 137/525.29;
62/511

[56] References Cited
UNITED STATES PATENTS

| 1,919,500 | 7/1933 | Carpenter .................... | 62/511 |
| 2,678,658 | 5/1954 | Rittenhouse ................. | 141/128X |
| 2,884,964 | 5/1959 | Tye ............................... | 141/128 |

*Primary Examiner*—Stanley H. Tollberg
*Assistant Examiner*—H. S. Lane
*Attorney*—David Rabin ABSTRACT: A control device for altering the delivery of fluid from a reservoir through a fluid dispenser in response to a generated signal decrease in fluid flow prior to delivery termination of a predetermined quantity of fluid to avoid motor overrun and computer inaccuracy. The device comprises a pressure sensitive capillary tube connected in parallel with the main solenoid operated valve passing fluid from the reservoir to the fluid dispenser.

PATENTED JAN 26 1971

3,558,011

INVENTOR.
JAMES A. TRACY

FLOW CONTROL DEVICE WITH RESTRICTED TERMINAL DELIVERY

BACKGROUND, BRIEF SUMMARY, AND OBJECTIVES OF THE INVENTION

In numerous automatic dispensing systems including those operable by presetting for delivery of a predetermined quantity of fluid or by programming the dispenser for a specific fuel quantity by means of currency and bills, it is customary to provide a "slowdown" feature which will terminate the high volume fluid delivery flow of the dispenser just prior to the end of the delivery cycle and continue the dispensing of fluid at a reduced rate until the selected fluid quantity is delivered so that the high volume flow need not be stopped abruptly. Attempts to terminate abruptly the high volume flow often result in pump motor override and computer drift thus causing inaccuracies in inventory and accounting practices.

The conventional approach in providing a slowdown feature is to include a second valve or orifice of reduced size which is controlled by a solenoid just in parallel with the main flow solenoid operated valve. When the dispenser has completed delivery of fluid except for a few remaining cents worth, a signal is provided which will cause the solenoid to close the main flow valve and continue fluid delivery at a reduced rate through the bypass valve by activating the bypass valve solenoid. Thus, fluid delivery then continues through the smaller orifice at a reduced flow rate until termination by a final control signal. The solenoid is then deenergized and both valves are closed until the dispenser is once again operated.

The present invention is directed to the bypass or slowdown feature of conventional automatic dispenser systems such as shown in U.S. Pat. No. 3,285,388 and U.S. Pat. No. 3,448,895 to Theodore J. Mesh. It has been found that a capillary tube embodying a single convolution may be connected in parallel with the main flow solenoid operated valve and thus replace the bypass solenoid operated valve at a great savings in cost and maintenance. The capillary tube functions effectively to provide a slowdown bypass feature in cooperation with the main flow solenoid operated valve and finds widespread application in all preset and coin-operated dispensing systems.

From the foregoing, it will be discernible that the primary objective of the present invention is to provide a slowdown device to replace costly solenoid operated bypass valves conventionally used for permitting a reduced flow rate in preset and coin-operated dispensing systems.

Another objective of the present invention is to provide a bypass device in the form of a capillary tube which is extremely economical to manufacture and essentially troublefree in operation.

Yet another object of the present invention is to provide a capillary bypass tube which is pressure-sensitive and embodies a single convolution for effective control of reduced fluid flow in a dispensing system.

These and other objects of the present invention will become more apparent after a consideration of the following detailed description taken in conjunction with the accompanying drawings wherein like characters of reference designate like parts throughout the several views.

FIGURE DESCRIPTION

DETAILED DESCRIPTION OF THE INVENTION

Figure 1:
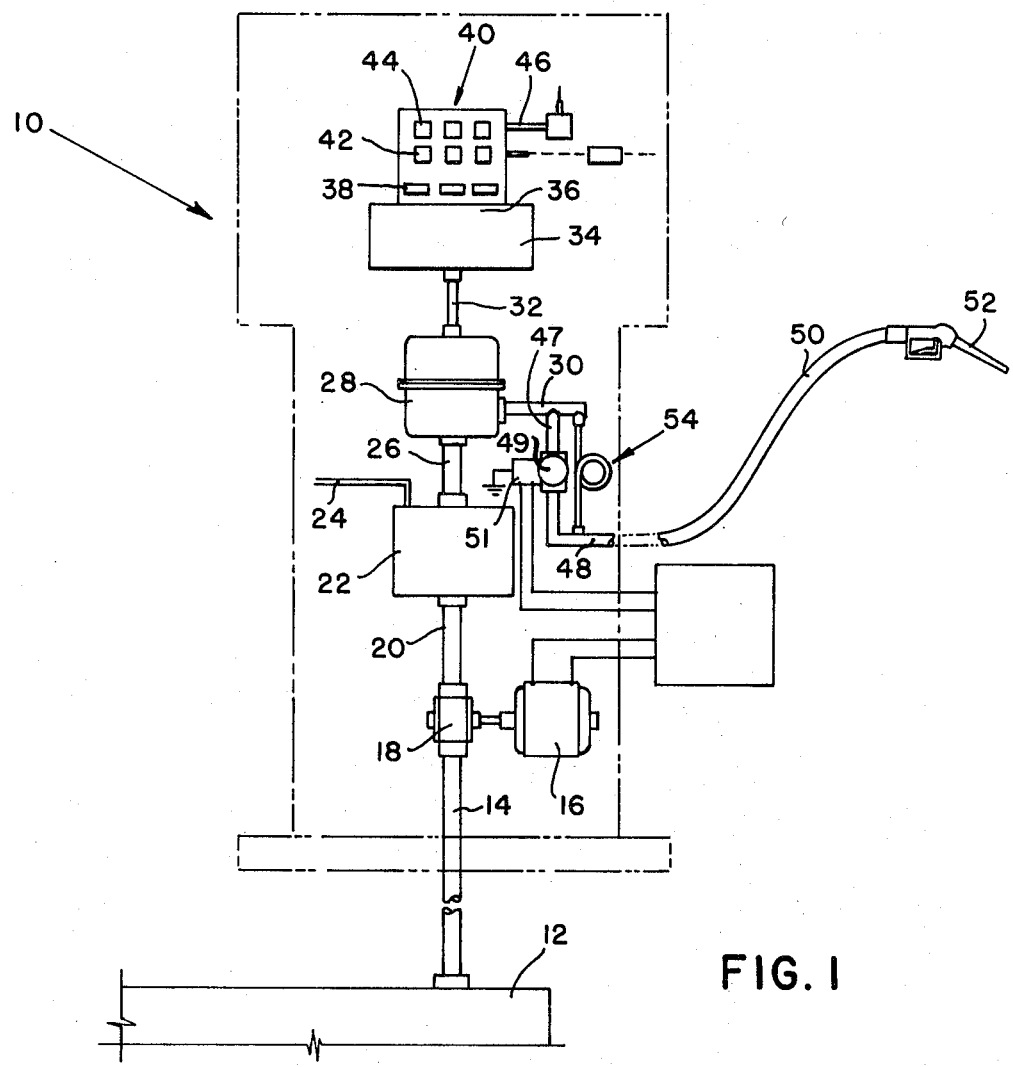
FIG. 1 is a schematic, sectional and fragmentary view of the operating components of a fluid dispenser such as is normally used to dispense fuel and the like embodying the present invention connected in parallel with the main flow solenoid-operated valve.
Figure 2:
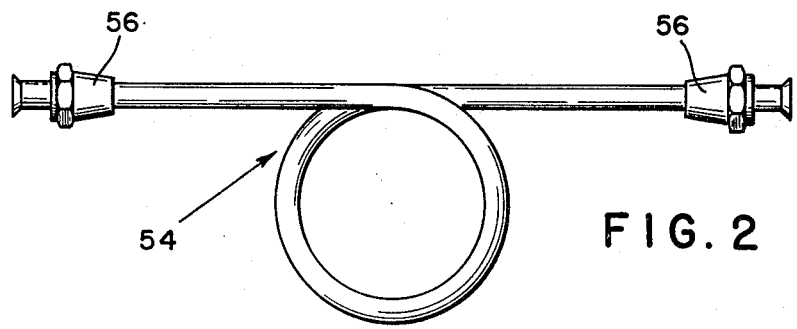
FIG. 2 is a greatly enlarged side elevational view of a capillary tube embodying the present invention.

The present invention has application in a fuel dispensing system generally indicated as 10 in FIG. 1 wherein gasoline is pumped from a gas storage tank 12 through a conduit 14 by a dispensing motor 16 which drives a pump 18 to the suction side of which is connected a fluid conduit 14. Gasoline is drawn from the tank 12 and discharged from the pump 18 through a pipe 20 into an air separator 22. Air is discharged through the atmosphere to a tube 24 and the liquid fuel flows through pipe 26 into the inlet side of the meter 28 to discharge through a pipe 30. Meter 28 is provided with an output shaft 32 connected to provide an input to a computer 34. The computer is comprised of the cost variator 36 which includes means 38 for displaying the cost per gallon and a register portion 40 which includes a gallons register 42 and a cost register 44. A shaft 46 is driven by the cost register 44 at the rate of, for example, one revolution for each ten cents of gasoline dispensed or some other convenient monetary denomination to furnish control pulses for the preset or coin-operated mechanism which will allow automatic cutoff of the dispensing operation when a predetermined quantity of fuel has been provided.

Pipe 30 conventionally branches into two pipes, the first of which, shown in FIG 1 as 47, has a valve 49 operated by a solenoid 51 for "high" flow, and the second (not shown), another normally closed solenoid-operated valve for "low" flow. These pipes then rejoin to form another pipe 48 which is connected to a delivery hose 50 that terminates in a nozzle 52. The circuitry and components for providing the dispenser with automatic shutoff control is normally connected to both of the solenoids controlling the flow valves referred to above so that low flow can be provided automatically by cutting out the high flow valve and opening the low flow valve during the last few cents worth of fuel delivery.

The present invention involves the replacement of the low flow valve with a capillary tube shown generally as 54 between the pipes 30 and 48 in parallel with the high flow solenoid-operated valve 49 which operates in a conventional manner and is controlled by the automatic preset or coin-operated dispensing system. The capillary tube 54 is preferably formed from soft annealed copper tubing with suitable connector components 56 being provided to insure leak-proof connections. The capillary tube preferably contains one convolution having a radius of about one inch in conventional dispensing systems though any suitable radius dimension may be used according to the needs of the particular application. Satisfactory results in conventional dispensing equipment have been obtained by using copper tubing having an interior diameter of between .14 and .15 inches. However, the internal diameter of the tube could vary from one-sixteenth to three-sixteenths of an inch.

The capillary tube is connected in parallel with the high flow solenoid-operated valve 56 in a manner shown best in FIG. 1. Thus a constant passageway is available for gasoline flow, but this passageway is pressure-sensitive so that no flow will occur when either the solenoid-operated valve 56 is open and flow is through that aperture at a rather rapid rate or when the pump motor 16 is deactivated so that there is no significant pressure within the dispenser. Thus when the automatic coin-operated or preset dispensing system is electronically controlled to terminate high flow after the major portion of the predetermined quantity has been dispensed or during the last few cents worth of delivery, the pump 16 will force fuel through the capillary tube 54 at a much reduced rate to produce a slow fill-up and avoid surge or spillover from the gasoline tank. Additionally, the reduced flow is much easier to control and avoids motor overrun and computer inaccuracy inherent when the high flow orifice is closed completely to terminate delivery of fuel abruptly.

It will be apparent that the provision of a capillary bypass tube as shown and described constitutes a considerable savings since the provision of an additional solenoid-operated valve is avoided as well as the control circuits and components necessary to actuate and deactuate automatically that solenoid. The tubing can be substituted for existing systems wherein solenoid-operated valves are present and a very sharp cutoff is achieved when flow is terminated.

While there has been illustrated a preferred embodiment of the bypass tube, obviously any number of variations may be made in the structure and design of this component without departing from the real spirit and purpose of the invention. Such changes as well as the use of mechanical equivalents are contemplated.

I claim:

1. In an apparatus for dispensing predetermined quantities of fluid from a reservoir, a conduit including a flow control device comprising: a valve providing an opening through which the major portion of a predetermined quantity of fluid may flow, operating means for opening and closing said valve, means controlling said operating means for the dispensing of said portion, and a static flow restricting bypass around said valve for passing fluid therethrough at a restricted rate on the closure of said valve by said operating means at the termination of delivery of said portion.

2. An apparatus as claimed in claim 1, said bypass including a tube connected in parallel with said valve means.

3. An apparatus as claimed in claim 2, said tube forming at least one convolution.

4. An apparatus as claimed in claim 3, said tube having an internal diameter of from one-sixteenth to three-sixteenths of an inch so that fluid flow through said tube is substantially less than fluid flow through said valve.

5. An apparatus for dispensing predetermined quantities of fluid from a reservoir, the apparatus having a conduit including a delivery nozzle, a pump and a solenoid-operated valve providing an opening through which the major portion of said predetermined quantity of fluid may flow from said reservoir to said nozzle, and a computer device for automatically controlling the dispensing of said predetermined quantity of fluid, the improvement comprising means for altering the rate of delivery of said flow in response to a signal generated by said computer device when the dispensing of said portion is terminated, said means comprising a static bypass around said valve, having a restrictive passage which passes fluid therethrough when the solenoid-operated valve is closed by said signal.

6. The improvement as claimed in claim 5, said bypass including a tube connected in parallel with said valve means.

7. The improvement as claimed in claim 6, said tube forming at least one convolution.

8. The improvement as claimed in claim 7, said tube having an internal diameter of from one-sixteenth to three-sixteenths of an inch so that fluid flow from said tube is substantially less than fluid flow through said solenoid-operated valve.